United States Patent [19]

Russo

[11] Patent Number: 5,350,259
[45] Date of Patent: Sep. 27, 1994

[54] PORTABLE BORING MACHINE

[75] Inventor: Evangelista Russo, Contrada Uria, Via Margherita,, I-88050 Sellia Marina CZ, Italy

[73] Assignees: Evangelista Russo, Sella Marina; Rinaldo Siracusa, Catanzaro, both of Italy

[21] Appl. No.: 956,981

[22] Filed: Oct. 6, 1992

[30] Foreign Application Priority Data

Oct. 7, 1991 [IT] Italy .................. RM91A000755

[51] Int. Cl.⁵ .................. B23B 45/00; B23B 47/02
[52] U.S. Cl. .................. 408/137; 408/138
[58] Field of Search .................. 408/18, 54, 137, 138, 408/141, 224, 234, 708

[56] References Cited

U.S. PATENT DOCUMENTS

| 1,284,456 | 11/1918 | Richards et al. | 408/708 |
|---|---|---|---|
| 3,803,927 | 4/1974 | Lawler | 408/138 |
| 3,955,629 | 5/1976 | Turner | 408/137 |
| 4,201,271 | 5/1980 | Evans | 408/137 |
| 4,730,958 | 3/1988 | Banoczky | 408/54 |
| 5,090,489 | 2/1992 | Ettori | 408/137 |
| 5,157,822 | 10/1992 | Farley | 408/234 |

FOREIGN PATENT DOCUMENTS

| 2445756 | 9/1980 | France | 408/137 |
|---|---|---|---|
| 57643 | 2/1992 | Japan | 408/138 |
| 8903269 | 4/1989 | World Int. Prop. O. | |
| 9101837 | 2/1991 | World Int. Prop. O. | |
| 9104816 | 4/1991 | World Int. Prop. O. | |

*Primary Examiner*—Daniel W. Howell
*Attorney, Agent, or Firm*—Browdy and Neimark

[57] ABSTRACT

A portable boring machine comprises a casing (1) at the interior of which a boring spindle (4) is rotatably supported and axially movable, wherein normally to the axis a number of through-holes (5) are machined, being parallel and spaced for housing, in a manner so that they can be locked in the desired position, at least one boring tool (6), said casing (1) being surrounded integrally by a housing (2), provided with a handle (3), at the interior of which there are located a first motor (28) and a second motor (33), respectively, for the rotation and the axial movement of said boring spindle (4), there being also provided means (24), (26) for the adjustment of the cutting blade of said drilling spindle, as well as a control unit (42) for the control of the several functions of the apparatus.

17 Claims, 1 Drawing Sheet

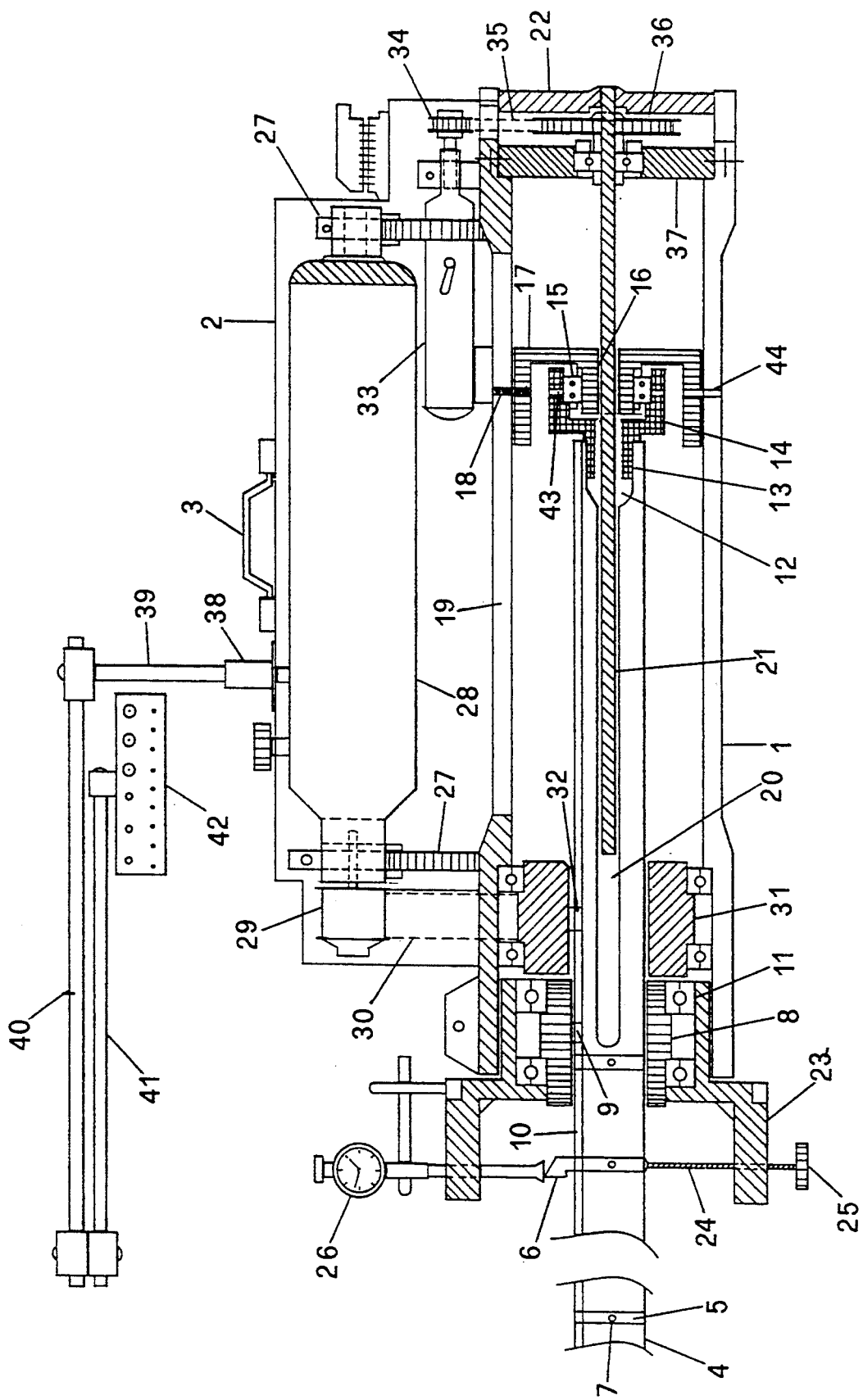

PORTABLE BORING MACHINE

BACKGROUND OF THE INVENTION

1. Field of the Invention

The present invention relates to a drilling machine, particularly to an apparatus for effecting the drilling of bore holes, having the feature that it is portable.

2. Description of the Prior Art

Known drilling machines are machine tools having a structure which is somewhat complex, encumbering and heavy, so that they are generally fixed and cannot be used in a versatile manner outside the establishments in which they are installed.

It would be extremely desirable, however, to be able to use a machine of this kind directly on a large number of job sites, thus avoiding the burden of transporting the article to be worked to the workshop, or worse still of having to resort to the complicated transfer of one of the conventional machines mentioned above onto the job site, should the piece to be worked not be transportable.

SUMMARY OF THE INVENTION

The object of the present invention is, therefore, to provide a drilling machine having a surprisingly simple and functional structure, of reduced weight and size, so as to render it portable and to create no problems in transportation and use wherever needed.

This object is obtained with a portable drilling machine, characterized in that it comprises: a casing, integrally surmounted by a housing; a drilling spindle, supported on the inside of said casing in a rotatable and axially mobile manner and extending out of said casing through the open front end of the latter; at least one drilling tool which can be positioned in one of a number of seats on said drilling spindle; first and second motor means arranged inside said housing, capable of imparting, by way of respective transmission means, a rotational movement and an axial translation movement to said drilling spindle.

The present invention will be more clearly illustrated in the following from the description of a preferred embodiment thereof, given as a non-limiting example, with reference to the single FIGURE of the enclosed drawing, which shows a cross-section view of the portable drilling machine object of the present invention.

DESCRIPTION OF THE PREFERRED EMBODIMENT

Going on to examine the above mentioned FIGURE, there is illustrated in 1 a cylindrically shaped casing of the drilling machine according to the invention, surmounted in an integral manner by a housing 2 having an open bottom, provided on top with a handle 3 for grasping and transporting the apparatus in question.

Coaxially inside the casing 1 the rear portion of a cylindrical drilling spindle 4 is positioned, mobile under rotation and in an axial direction, as will be described in greater detail below. The spindle 4 extends outward through the open front end of the casing itself for a length which varies according to the operating conditions. On the operating length of the spindle 4 a series of equidistant through holes 5 are formed, perpendicular to the axis of said spindle. Holes 5 receive at least one cutting tool or drilling tool 6 capable of being fixed in a hole 5 by means of a pin which engages a hole 7, made on the stem of the drilling tool 6, and passing through a corresponding hole made transversally through the spindle 4.

The spindle 4 is supported in correspondence with the front opening of the casing 1 by means of a centering bush 8, provided with a key 9 engaged with a spline 10 formed on the upper side of the spindle 4 and extending all the way along said spindle, so as to ensure rotation of the bush 8 integrally with the spindle 4 on bearings 11.

On the rear end of the spindle 4 a cylindrical cavity 12 is formed. The cavity is threaded internally, to be fixed by screwing onto an externally threaded cylindrical protrusion 13 on a support 14 integral with the spindle 4 and rotating by means of bearings 15 on an internally threaded hub 16 of spindle feeding means 17. Means 17 is formed by a hollow cylindrical body, provided with an end plate. The rotation of the end plate is prevented by a pin 18 which engages with a longitudinal slot 19 provided on the top of the wall of the casing 1. The slot 19 also allows the spindle feeding means 14 to slide axially between the front and rear ends thereof.

The rear portion of the spindle 4 is provided with an axial hole 20, in which the front portion of a worm screw 21 is housed. The screw thread of the worm screw is engaged with the internal thread on the hub 16 of the spindle feeding means 17 and the rear end of the worm screw is supported in a rotatable but not axially mobile manner by a closure end plate 22 of the rear end of the casing 1.

On the front end of the casing 1 there is fixed, by means of conventional fastening means (not shown), a hollow cylindrical head 23, to be used in particular for positioning of the apparatus of the invention with respect to the article to be worked. The head 23 has formed on its bottom part a first threaded hole to engage with a screw 24, provided with an actuating hand wheel 25 on the outer end, for adjustment of the position of the cutting blade of the drilling tool 6 with respect to the spindle 4. The first hole corresponds, in a diametrically opposite position, with a second hole in which the shank of a micrometer 26 is engaged for measuring the position of the cutting blade of the drilling tool 6 with respect to the spindle 4.

For the rotating movement of the spindle 4 around its axis, inside the housing 2 is supported, by means of two end supports 27, a main motor unit 28, provided with reduction gear, reverse gear and speed controller. On the output shaft of the unit 28 a pulley 29 is fixed, connected by means of a driving belt 30 to a bush 31 integral with the spindle 4 by means of a key 32 which engages a spline 10 on the spindle 4.

For the axial displacement movement of the spindle 4 there is provided inside the housing 2 a second motor 33, also provided with a reduction gear, reverse gear and speed controller, on the output shaft of which is keyed a first pulley 34 connected, by means of a toothed belt 35, to a second pulley 36, keyed to the worm screw 21 and supported in a rotating manner by a plate 37 close to the rear end of the casing 1.

On the upper wall of the housing 2 is fixed a sleeve 38 with which the lower end of a bar 39 is engaged. On the upper end of the bar 39 one end of a first arm 40 is mounted in a rotatable manner. The other end of the bar 39 is connected in a rotatable manner to one end of a second arm 41. On the other end of arm 41 an electronic central unit 42 is fixed for command of the various functions of the apparatus in question. The arrangement of rotating arms given above has the function of enabling the operator to be continually within reach of the central unit 42, no matter what the position of the latter may be with respect to the apparatus.

It should be noted that on the outer wall of the spindle feeding means 17 a number of circumferentially spaced holes 43 are formed, capable of being engaged one at a time with a plug by means of a similar hole 44 formed on the bottom of the wall of the casing 1 so as to block the spindle 4 when making adjustments to the position of the drilling tool 6.

Finally, it should be noted that on the side wall of the housing 2 a slot is formed longitudinally (not shown), provided with a scale in millimeters, along which, on the outside of the casing, an arrow-shaped index (not shown) runs, connected to the pin 18 of the member 17 to give a visual indication of the amount of axial movement of the spindle 4.

In the slot mentioned above there are provided two limit stops which can be moved therein to fix, according to working conditions, the stroke of the spindle 4.

In operation, the drilling machine object of the invention is positioned and blocked, by means of fixed supports, with the spindle 4 axially centered in the hole to be bored. The position of the cutting blade of the drilling tool 6 with respect to the spindle 4 is adjusted, according to working conditions, blocking the spindle 4 by insertion of a plug in one of the holes 43 in the member 17 through the hole 44 in the casing 1, and sliding the drilling tool in the through hole 5 in which it is inserted. Then the drilling tool is blocked, when it is in position, by means of a plug which engages the hole 7 in the drilling tool itself through the corresponding hole formed in the spindle 4. The motors 28 and 33 are activated by means of the commands on the central unit 42, and said motors are adjusted to respective appropriate speeds. The first of them, by means of the pulley 29/belt 30/bush 31 group with relative key 32 engaged in the slot 10 of the spindle 4, causes the spindle 4 to rotate, while the second, by means of the pulley 34/toothed belt 35/pulley 36 causes the worm screw 21 to rotate. By reason of the engagement of worm screw 21 with the threading in the hub 16 of the member 17 connected to the support 14, onto the protrusion 13 of which the spindle 4 is screwed, the spindle 4 is moved in turn in an axial direction. The simultaneous rotating and translating movement of the spindle 4 is thus obtained in order to effect the drilling operation by means of the drilling tool 6.

I claim:

1. Portable boring machine comprising, a casing, integrally surmounted by a housing; a drilling spindle, supported on the inside of said casing in a rotatable and axially mobile manner and extending out of said casing through the open front end of the latter; at least one drilling tool which can be positioned in one of a number of seats on said drilling spindle; first and second motor means arranged inside said housing, capable of imparting, by way of respective transmission means, a rotational movement and an axial translation movement to said drilling spindle, a centering bush integral in rotation with said spindle in correspondence with said open front end of said casing to support said spindle, a rotating body fixed in an immovable manner to the rear end of said spindle and axial displacement means engaged with said rotating body, said displacement means being provided with means to allow a translation movement and to prevent rotation thereof.

2. Portable boring machine, comprising a casing, integrally surmounted by a housing; a drilling spindle, supported on the inside of said casing in a rotatable and axially mobile manner and extending out of said casing through the open front end of the latter; at least one drilling tool which can be positioned in one of a number of seats on said drilling spindle; first and second motor means arranged inside said housing, capable of imparting, by way of respective transmission means, a rotational movement and an axial translation movement to said drilling spindle, wherein at least one handle is provided for carrying.

3. Boring machine according to claim 1 wherein said means for preventing the rotation and allowing a translation movement of said axial displacement means are formed by a pin element fixed to said means and said casing having a longitudinally extending slot in engagement with said pin element, so as to allow said translation movement within the rear and front end of said slot.

4. Boring machine according to claim 1, characterized in that said number of seats for said at least one drilling tool is made up of a number of through holes made at even spaces in said drilling spindle, perpendicular to the axis thereof, in each of which said at least one drilling tool is capable of sliding and being fixed in such a way that a cutting end is, with respect to the axis of said drilling spindle, in a position suited to the working conditions.

5. Boring machine according to claim 1, characterized in that said first and second motor means are formed by electric motors, each one provided with a reduction gear, reverse gear and speed controller.

6. Boring machine according to claim 1, characterized in that said transmission means for imparting said rotational movement to said drilling spindle are formed by a pulley, keyed to the output shaft of said first motor means, connected by means of a driving belt to a bush capable of rotating integrally with said drilling spindle.

7. Boring machine according to claim 1, characterized in that said transmission means for imparting said axial translation movement to said drilling spindle comprise a first pulley, fixed to the output shaft of said second motor means, a second pulley fixed to a worm screw supported in a coaxially rotatable manner inside said casing, an endless toothed belt connecting said first and second pulleys, the front portion of said worm screw extending into a hole provided axially in said drilling spindle and through said axial displacement means, and said worm screw engaging a threading formed on a hub element of the means, and further extending through said rotating body which supports the rear end of said drilling spindle.

8. Boring machine according to claim 4, further comprising, for adjustment of the position of the cutting end of said at least one drilling tool with respect to the axis of said drilling spindle, screw adjustment means supported on said casing for the movement of said at least one drilling tool in a direction perpendicular to the axis of said drilling spindle until bringing the cutting end into a pre-fixed position and micrometer means for measuring and pre-fixing said position of said cutting end of said drilling tool.

9. Boring machine according to claim 1, characterized in that a central unit is provided, associated in a fixed or mobile manner to the body of said drilling machine, to command and adjust the various functions thereof.

10. Boring machine according to claim 9, characterized in that said central unit is an electronic unit.

11. Boring machine according to claim 2, characterized in that a central unit is provided, associated in a fixed or mobile manner to the body of said drilling machine, to command and adjust the various functions thereof.

12. Boring machine according to claim 1, characterized in that in said axial displacement means of said drilling spindle, at least one hole is made, which can be engaged with a plug element through a similar corresponding hole formed through the wall of said casing to block said drilling spindle during said operation for adjustment of the position of the cutting end of said at least one drilling tool.

13. Boring machine according to claim 1, characterized in that at least one handle is provided for carrying.

14. Boring machine according to claim 2, characterized in that said number of seats for said at least one drilling tool is made up of a number of through holes made at even spaces in said drilling spindle, perpendicular to the axis thereof, in each of which said at least one drilling tool is capable of sliding and being fixed in such a way that a cutting end is, with respect to the axis of said drilling spindle, in a position suited to the working conditions.

15. Boring machine according to claim 2, characterized in that said first and second motor means are formed by electric motors, each one provided with a reduction gear, reverse gear and speed controller.

16. Boring machine according to claim 2, characterized in that said transmission means for imparting said rotational movement to said drilling spindle are formed by a pulley, keyed to the output shaft of said first motor means, connected by means of a driving belt to a bush capable of rotating integrally with said drilling spindle.

17. Boring machine according to claim 14, further comprising, for adjustment of the position of the cutting end of said at least one drilling tool with respect to the axis of said drilling spindle, screw adjustment means supported on said casing for the movement of said at least one drilling instrument in a direction perpendicular to the axis of said drilling spindle until bringing its cutting blade into a pre-fixed position and micrometer means for measuring and pre-fixing said position of said cutting end of said drilling tool.

* * * * *